Jan. 30, 1968     T. R. QUERMANN     3,365,959
ANTI-FRICTION SUPPORT MECHANISMS FOR GYROSCOPIC DEVICES
Filed July 22, 1965     3 Sheets-Sheet 1

INVENTOR.
THOMAS R. QUERMANN
BY
ATTORNEY

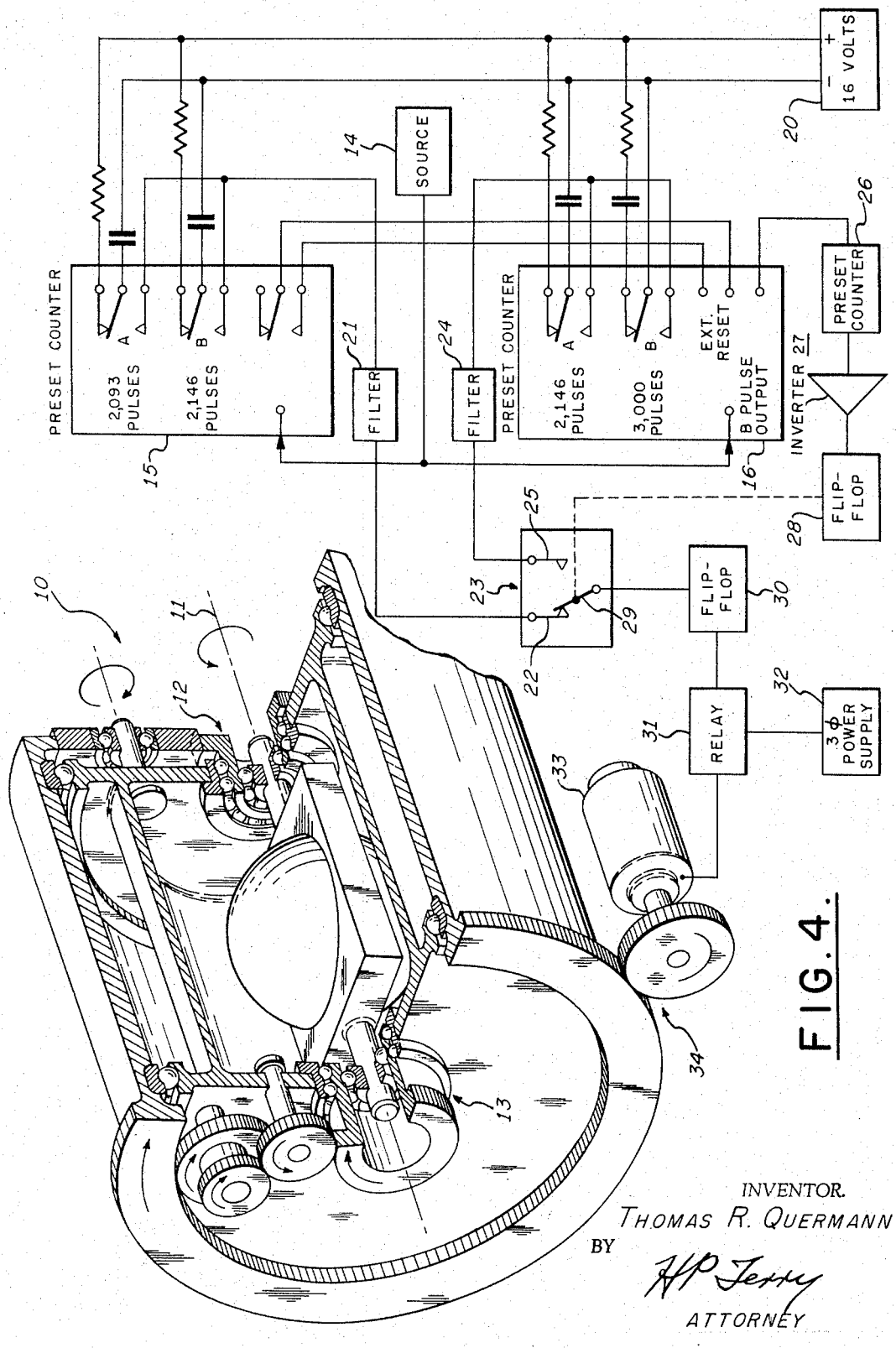

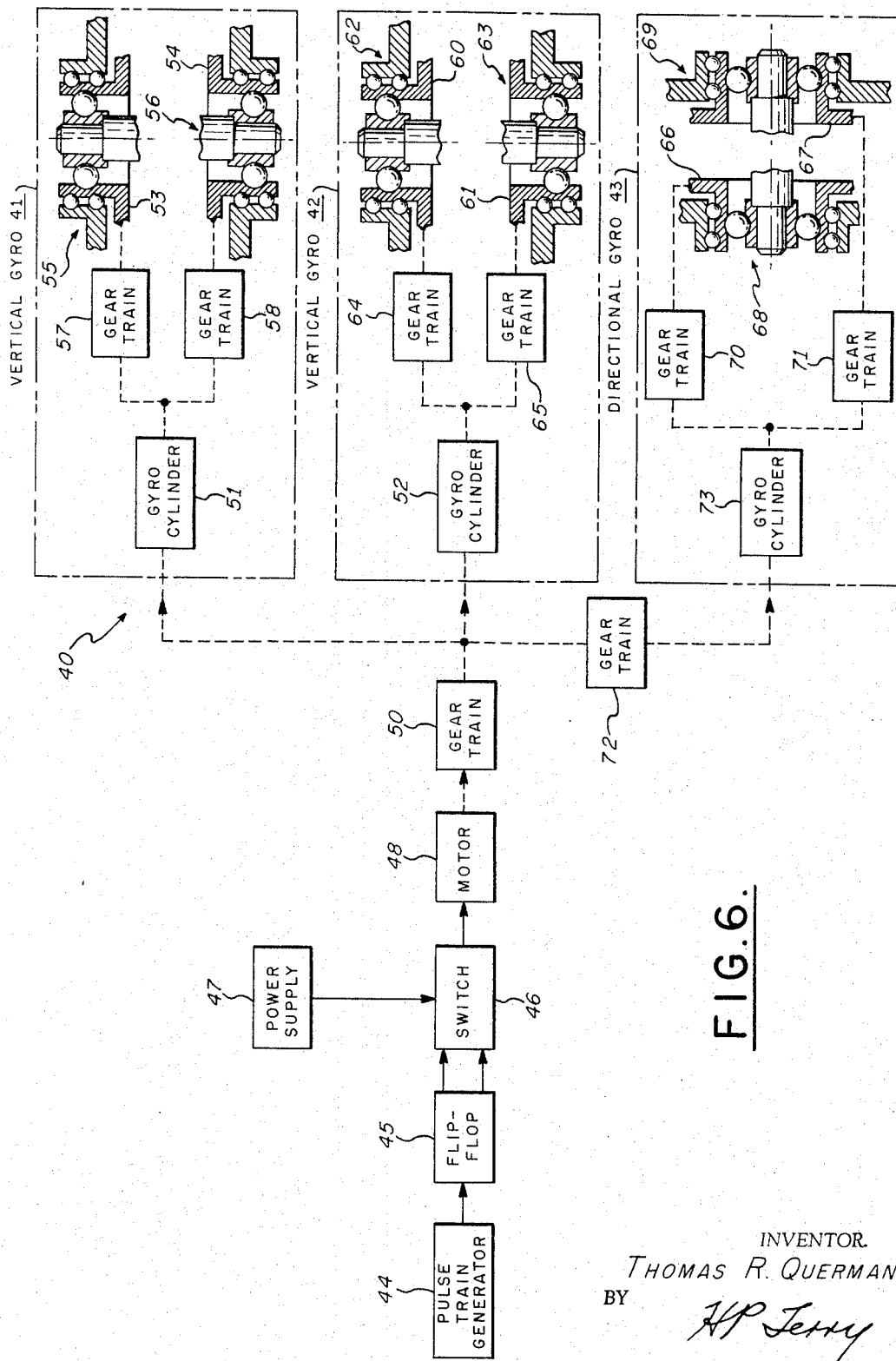

United States Patent Office 3,365,959
Patented Jan. 30, 1968

3,365,959
ANTI-FRICTION SUPPORT MECHANISMS FOR GYROSCOPIC DEVICES
Thomas R. Quermann, Huntington Station, N.Y., assignor to Sperry Rand Corporation, Great Neck, N.Y., a corporation of Delaware
Filed July 22, 1965, Ser. No. 473,984
21 Claims. (Cl. 74—5)

The present invention relates to anti-friction support mechanisms for the sensitive elements of precision devices such as gyroscopes and particularly relates to anti-friction mechanisms and methods for improving the accuracy of such devices. The accuracy of a gyroscopic device is usually defined as a certain level of drift rate of the gyroscopic spin axis in inertial space. This drift rate is governed by the law $$W = \frac{L}{H}$$

where W is the drift rate, H is the angular momentum of the gyroscopic element and L is the disturbing torque, each being present on mutually perpendicular axes.

A method and apparatus for reducing drift in gyroscopic devices is disclosed in U.S. Patent No. 2,970,480 entitled Anti-Friction Support Mechanism for Gyroscopic Devices of Zeigler et al., issued Feb. 7, 1961 and assigned to the same assignee as the present invention. In said U.S. Patent No. 2,970,480, the drift is reduced by rotating the intermediate races of each of two diametrically opposed compound bearings of the support mechanism in opposite directions and reversing the direction of rotation of each of said intermediate races periodically and simultaneously after a predetermined number of revolutions. The intermediate races as disclosed in said U.S. Patent No. 2,970,480 are rotated through the same angle in first one direction and then the opposite direction.

It has been found that utilizing the invention described in said U.S. Patent No. 2,970,480 substantially reduces the average or D.C. level of the undesirable aforementioned torques which result in drift thereby reducing the average drift rate appreciably. The symmetrical reversal cycles disclosed in said U.S. Patent No. 2,970,480 result in the difference in the average torque between the two spaced compound bearings acting for the same time in each direction, thus causing no long term bias in the gyro drift. However, in addition to the average torque there are cyclic torques which depend upon the instantaneous position of the ball pattern in the sensitive bearing. Asymmetries in the bearings, alignment, or driving forces, may cause the ball complement of a compound bearing to rotate at a slightly different speed in one direction with respect to that in the other. This causes the ball pattern position at the moment of reversal to vary from reversal to reversal. Since there is an unaveraged portion of cyclic torque introduced into the gyroscope if reversal occurs at intervals different from integral numbers of cycles, variations of the reverse point will cause a corresponding variation in the average drift rate of the gyroscope. The magnitude of this effect is increased by increasing the time spent during reversal.

The present invention is an improvement over the invention described in said U.S. Patent No. 2,970,480 in that in addition to the reduction of drift provided by the invention disclosed in said U.S. Patent 2,970,480, the present invention provides a further improvement in the averaging of the undesirable torques thereby reducing the drift characteristic. According to the present invention, improvements in the averaging of the torques are achieved by asymmetrically driving the compound bearings in order that each bearing is driven further in one direction than the other in order that the ball complement has a definite progression. Also, the direction of asymmetry is periodically reversed. The periodic reversals in the direction of this asymmetry cancel the average bias torque created by the asymmetry. Further improvements in the averaging of the torques are achieved by increasing the speed of rotation of the bearings, reducing the reversing time, and increasing the time between reversals.

It is a primary object of the present invention to provide an improved anti-friction support mechanism for precision instruments.

It is a further object of the present invention to provide an improved anti-friction support mechanism for gyroscopic instruments which appreciably improves the accuracy of said instruments.

It is an additional object of the present invention to provide an improved method for reducing the drift rate of gyroscopic instruments and thereby improving the accuracy thereof.

These and other objects of the present invention will become apparent by referring to the drawings:

FIG. 4 is a schematic diagram of a gyroscopic apparatus incorporating the present invention;

FIG. 6 is a schematic diagram of a three gyro platform embodying the present invention.

Figure 1:
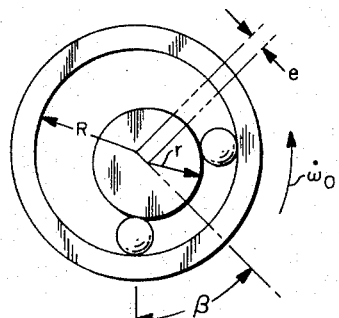
FIG. 1 is a sectional view through a typical radially loaded ball bearing.
Figure 2:
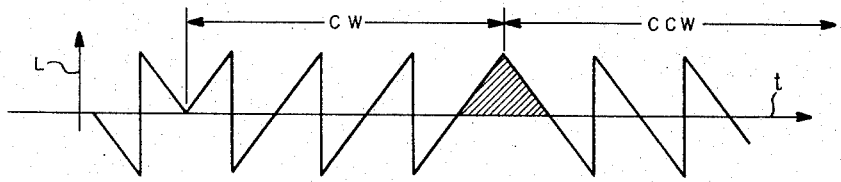
FIG. 2 is an idealized graph showing a typical prior art cycle indicating the uncompensated torques.

In order to fully appreciate the present invention, a discussion of the principles involved will now be provided. Referring to FIG. 1, the basic conservative torque expression for a radially loaded ball bearing is:

$$L = \frac{rwe \sin \beta}{R+r}$$

where r = radius of inner race at ball track
R = radius of outer race at ball track
e = eccentricity of inner race with respect to outer
β = angle between applied load and axis of symmetry between the two load carrying balls
w = radial load FIG. 2 shows the conservative torque derived above for a single bearing phased for maximum averaging imperfection utilizing the symmetrical cycle described in said U.S. Patent 2,970,480 wherein instantaneous reversing is assumed. The shaded area represents the uncompensated torque impulse.

Figure 3:
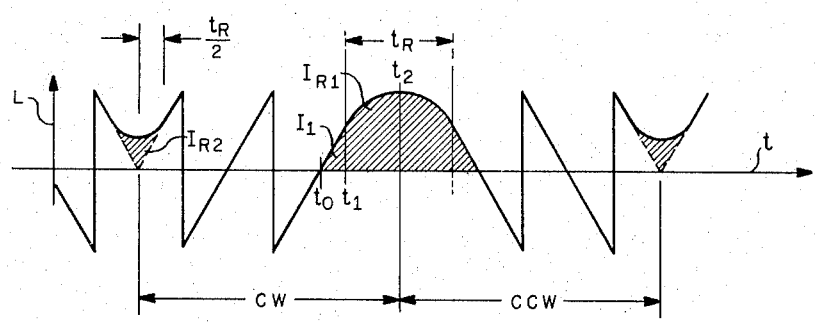
FIG. 3 is a cycle similar to FIG. 2 wherein reversal time is taken into consideration.

If reversal time is taken into consideration, the idealized aforementioned symmetrical cycle appears as shown in FIG. 3 with the shaded area again representing the uncompensated torque impulse. The magnitude and sign of the unaveraged torque impulse with respect to the long term D.C. torque of the bearing depends upon the positions of the ball pattern at the moments of reversal. Since the ball patterns do not necessarily rotate at the same speed for equal speed opposite direction rotations of the driven race, the positions of the ball pattern at reversal will slowly change from cycle to cycle giving rise to a slow cyclic variation in the unaveraged torque impulses. Typical rates of progression observed for bearings rotating at one revolution per second (r.p.s.) and reversing every ten seconds have ranged from zero to one revolution of the ball complement in fifteen minutes. For typical bearings having 6 to 8 balls there are 6 to 8 torque cycles per revolution of the ball complement, i.e., one per ball.

The period of this disturbance is thus two minutes minimum and more typically 3 to 5 minutes.

These low frequency torque variations limit the reaction time capability of systems using this type of gyroscope. FIG. 3 illustrates the increased magnitude of unaveraged torque which results from increasing the time spent during reversal.

The essence of the present invention is to drive each bearing through a greater angle in one direction than the other. This can be accomplished by (1) driving at equal speeds for different times; (2) driving at unequal speeds for equal times; or (3) driving at unequal speeds for unequal times.

Driving the bearing through a greater angle in one direction than the other causes a progression of the driven race and also the ball complement in the direction of the drive through the greater angle. When driving the bearings for different times with respect to the two directions, the unequal driving times together with mismatched average torques between the two counter-rotating bearings of a pair thereof will cause an average bias torque with respect to the gyroscope equal to $$\frac{t_1-t_2}{t_1+t_2}(L_1-L_2)$$

where $t_1$ and $t_2$ are the two different times between reversal and $L_1$ and $L_2$ are the average running torques of the two bearings. By periodically reversing the direction of the asymmetry, this average bias can be cancelled. Let $t_1$=time for clockwise (CW) rotation of one bearing and $t_2$=time for counterclockwise (CCW) rotation. If $t_1>t_2$, the average torque of that bearing will be CW. If the sense of the asymmetry is reversed, $t_1<t_2$, the average torque of that bearing will reverse and become CCW.

It will be noted that the source of periodic torque variations is sampled only once during each reversal. In order to average this torque rapidly, a large number of samples is desired. This suggests a very short time between reversals. If the time is selected so that the bearing moves thru one torque cycle between reversals, a nominal cancellation will occur and many reversals will be achieved for averaging the remainder. Thus, the preferred cycle is an asymmetric oscillation which progressively moves the driven race at a relatively low speed and periodically reverses the direction of the progression. The purpose of asymmetry is to force the ball complement to vary its position from reversal ot reversal at a rapid rate to permit more rapid averaging of bearing torques.

Figure 5:
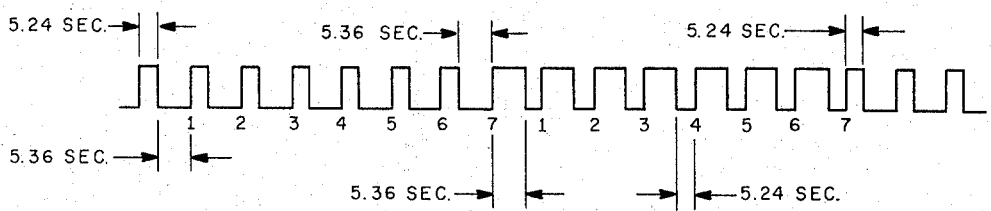
FIG. 5 is a graph showing an asymmetrical reversal cycle associated with the present invention.

Referring now to FIG. 4, an embodiment of the present invention is shown with respect to a single gyroscope 10 supported about an axis of precession 11 by means of first and second spaced compound bearings 12 and 13, respectively. The purpose of the circuit shown in FIG. 4 is to generate pulses to provide for periodic motor reversal in accordance with the asymmetrical pulse train shown in FIG. 5. The cycle shown in FIG. 5 is an asymmetric reversing cycle superimposed upon the symmetrical reversing cycle disclosed in said U.S. Patent No. 2,970,480. It will be appreciated that there are many other suitable means for generating an asymmetric cycle applicable to the present invention.

A source 14 provides a voltage having a predetermined frequency, for example 400 cycles per second within ±0.01%, which is connected to the input of dual preset counters 15 and 16, respectively. Each of the dual preset counters 15 and 16 may be individually set to provide first and second pulses corresponding to their internal channels A and B, respectively, depending upon the number selected on external control dials. For example, the dual preset counter 15 may be set to count 2,093 pulses on its A channel and 2,146 pulses on its B channel while the preset counter 16 may be arranged to count 2,146 pulses on its A channel and 3,000 pulses on its B channel. The 400 c.p.s. frequency from the source 14 is counted by both dual preset counters 15 and 16. Each dual preset counter is switched to the alternate mode by means of its front panel control and to the pulse relay mode by means of a control mounted internally. These controls are conventional and are therefore not shown.

The relays defining the channels A and B of the respective dual preset counters 15 and 16 are connected to a common constant voltage source 20. An output of the B channel of duel preset counter 15 is connected to the external reset of dual preset counter 16. The A and B channels of the dual preset counter 15 have additional output terminals connected through a filter 21 to the leftward contact arm 22 of a relay 23. Similarly, output terminals of the channels A and B of the dual preset counter 16 are connected through a filter circuit 24 to the rightward contact arm 25 of the relay 23.

A single preset counter 26 is connected to the dual preset counter 16 and is responsive to the pulses emanating from the B pulse output therefrom. The single preset counter 26 counts the B pulses and when a preset number as set by a control dial is reached the counter 26 delivers a pulse through an inverter 27 to trigger a flip-flop 28 which actuates the contact arm 29 of the relay 23 to select the alternate dual preset counter 15 or 16.

The frequency of the source 14 and the sum of numbers set into dual preset counter 15 determine the time between pulses emanating from the preset counter 26, for example (2,093+2,146) times 2.5 milliseconds=10.6 seconds. The contact arm 29 of the relay 23 is connected to a flip-flop 30 which in turn controls the power reversing relay 31.

A power supply 32 which provides three-phase 100 cycle per second current is connected through the relay 31 to a three-phase reversible synchronous motor 33. The motor 33 is connected through a gear train 34 to drive the intermediate races 35 and 36 of the compound bearings 12 and 13, respectively, in opposite directions with respect to each other. The position of the power reversing relay 31 determines the direction of motor rotation.

In operation, assume that the contact arm 29 of the relay 23 is in the position shown abutting the leftward contact 22, that the dual preset counters are adjusted as indicated previously, and the number displayed on the single preset counter 26 is zero. The dual preset counter 15 with respect to its channel A while counting 2,093 pulses provides an output through the filter 21, relay 23, flip-flop 30 and relay 31 to maintain the relay 31 in a predetermined position for 5.24 seconds thereby causing the power supply 32 to rotate motor 33 in a clockwise direction, for example for 5.24 seconds. The motor 33 thus drives both the intermediate races 35 and 36 through the gear train 34 for 5.24 seconds in directions opposite with respect to each other. At the end of 5.24 seconds, a pulse is provided from the counter 15 which triggers the flip-flop 30 to actuate the relay 31 thereby causing reversal of the power supply to the motor 33 and thus the direction of rotation of the motor 33. The dual preset counter 15 then counts 2,146 pulses by means of its channel B and at the end of 5.36 seconds, the flip-flop 30 is again triggered by the counter 15 to cause the relay 31 to reverse the power supply 32 to the motor 33 to cause the motor 33 to again reverse its direction of rotation. This cycle thus causes the intermediate races 35 and 36 to be driven in one direction for a period of 5.24 seconds and in the opposite direction for a period of 5.36 seconds, thereby providing the desired asymmetrical rotation.

When a pulse from the B channel at counter 15 is triggered, the counter 16 is reset, and a pulse is set to the input of preset counter 26. After a predetermined number of such pulses, for example seven, the single preset counter 26 provides an output pulse which is inverted in the inverter 27 and triggers the flip-flop 28 to change the position of the relay 23 in order that the contact arm 29 now abuts against the rightward contact 25. The dual preset counter 16 by means of its channel A now starts to count for 5.36 seconds and at the end of that time the flip-flop 30 is again triggered to energize the relay 31 to reverse the power supply to the motor 33 to cause reversal of the rotation of the intermediate races 35 and 36. Channel B of the dual preset counter 16 now begins to count. At the end of 5.24 seconds, dual preset counter 16 is reset by a pulse from the B channel of dual preset counter 15 and the flip-flop 30 is again triggered to cause the relay 31 to switch and again cause reversal of the motor 33. This provides an asymmetric cycle with respect to the 5.24 and 5.36 second cycle with an overall reversal after seven cycles, as shown in FIG. 5, thereby not only averaging the D.C. torque levels with respect to the overall cycle but also the minute torque introduced by asymmetries in the bearings 12 and 13, as explained previously. This appreciably improves the accuracy of the gyroscope 10 by reducing its drift rate.

Preferably, the B channel of the dual preset counter 16 is made to respond to a larger number than those of the other channels in order to maintain the counters 15 and 16 in synchronism. The sum of the A and B counts for counters 15 and 16 would be the same if the B channel of counter 16 were set to the same number as the A channel of counter 15, i.e., 2,093. However, with the B channel of counter 16 set to a larger number, for example 3,000, the reset pulse is provided from counter 15 such that the net result to recycle both counters 15 and 16 simultaneously when the counter 15 has counted its channel A and B numbers.

Referring now to FIG. 6, an alternative embodiment of the present invention will be described with respect to a three gyro platform 40 generally of the type shown in said U.S. Patent No. 2,970,480 but having a pair of vertical gyroscopes 41 and 42 and a directional gyroscope and utilizing the present invention. The asymmetrical pulse train may be provided as shown in FIG. 4 or from another type of asymmetrical pulse train generator or by a computer which may be otherwise associated with the system. The asymmetrical pulse train generator 44 triggers a flip-flop 45 which in turn is connected to a power reversing switch 46. A suitable power supply 47 provides power through the switch 46 to a reversible motor 48 for driving the motor 48 in a direction depending upon the condition of the switch 46. The motor 48 is connected through a step-down gear train 50 to drive rotatable hollow temperature attenuating cylinders 51 and 52 in their respective vertical gyroscopes 41 and 42. The intermediate races 53 and 54 of the spaced compound bearings 55 and 56, respectively, of the vertical gyro 41 may be driven at different speeds by means of gear trains 57 and 58 having different gear ratios connected between the cylinder 51 and the intermediate race 53 and the cylinder 51 and the intermediate race 54, respectively, in a manner more fully described in U.S. patent application S.N. 365,405, now Patent No. 3,336,811, entitled Antifriction Support Mechanism for Gyroscopes of Martin S. Klemes and Thomas R. Quermann and filed on May 6, 1964. The vertical gyro 42 may have its intermediate races 60 and 61 of its spaced compound bearings 62 and 63, respectively, driven through gear trains 64 and 65 having different gear ratios in a similar manner to that described above with respect to the gyro 41.

The directional gyro 43 may have its intermediate races 66 and 67 of its respective spaced compound bearings 68 and 69 driven at different speeds by means of gear trains 70 and 71 having different gear ratios with respect to each other. The intermediate races 66 and 67 may also be driven at substantially higher speeds than the corresponding intermediate races of the vertical gyros by means of a step-up gear train 72 connected between the gear train 50 and the rotatable cylinder 73 of the directional gyro 43.

In operation, the asymmetrical rotation of the intermediate races of the vertical gyros 41 and 42 and the directional gyro 43 is similar to that described above with respect to FIGS. 4 and 5. The asymmetrical pulse train from the generator 44 triggers the flip-flop 45 to cause the reversing switch 46 to reverse the power supplied to the synchronous motor 48 in order that the motor 48 rotates a greater angle in one direction than in the opposite direction. This causes the intermediate races 53, 54, 60, 61, 66 and 67 to rotate a greater angle in one direction than in the opposite direction, it being understood that the intermediate races of a pair associated with a particular gyroscope rotate in directions opposite with respect to each other at any one particular time.

As explained above with respect to FIGS. 4 and 5, after a predetermined number of reversals each associated with an asymmetric cycle, the asymmetry is reversed by means of the pulses provided by the generator 44 which would in this embodiment produce a pulse train as shown in FIG. 5.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. In combination;
 (a) a sensitive element,
 (b) bearing means for rotatably supporting said sensitive element about an axis thereof,
 (c) said bearing means including at least an inner and outer race and at least one rotatable intermediate race supporting rolling members therebetween,
 (d) drive means coupled to said intermediate race for rotating said intermediate race, and
 (e) control means coupled to said drive means for driving said intermediate race through a first angle in a first direction and for driving said intermediate race through a second angle different from said first angle in a second direction opposite to that with respect to said first direction.

2. In combination;
 (a) a sensitive element,
 (b) bearing means for rotatably supporting said sensitive element about an axis thereof,
 (c) said bearing means including at least an inner and outer race and at least one rotatable intermediate race supporting rolling members therebetween,
 (d) drive means coupled to said intermediate race for rotating said intermediate race,
 (e) first control means coupled to said drive means for driving said intermediate race through a first angle in a first direction,
 (f) and second control means coupled to said drive means for driving said intermediate race through a second angle different from said first angle in a second direction opposite to that with respect to said first direction.

3. In combination;
 (a) a sensitive element,
 (b) bearing means for rotatably supporting said sensitive element about an axis thereof,
 (c) said bearing means including at least an inner and outer race and at least one rotatable intermediate race supporting rolling members therebetween,
 (d) drive means coupled to said intermediate race for rotating said intermediate race,
 (e) and control means coupled to said drive means for driving said intermediate race through first and second angles different with respect to each other and in first and second directions respectively for progressively rotating the complement of said rolling members associated with said intermediate race.

4. In a combination as recited in claim 3 further including means for reversing the directions of said asymmetrical rotations only after at least one full revolution of progression of said rolling member complement.

5. In combination;
 (a) a sensitive element, (b) first and second spaced bearing means for rotatably supporting said sensitive element about an axis thereof,
(c) each of said bearing means including an inner and outer race and a rotatable intermediate race supporting rolling members therebetween,
(d) drive means for driving said intermediate races in directions opposite with respect to each other and periodically reversing,
(e) and each of said intermediate races being driven such that the complement of rolling members associated with the respective intermediate race continuously progresses.

6. In combination:
(a) a sensitive element,
(b) first and second spaced bearing means for rotatably supporting said sensitive element about an axis thereof,
(c) each of said bearing means including an inner and outer race and a rotatable intermediate race supporting rolling members therebetween,
(d) drive means for driving said intermediate races in directions opposite with respect to each other and periodically reversing,
(e) first control means coupled to said drive means for rotating said intermediate races through first angles,
(f) and second control means coupled to said drive means for rotating said intermediate races through second angles, said second angles being different from said first angles whereby said rolling members associated with said respective intermediate races continuously progress.

7. In a combination as recited in claim 6 and further including additional control means for reversing the direction of rotation with respect to said first and second angles only after at least one full revolution of progression of said rolling members associated with said respective intermediate races.

8. In a combination as recited in claim 6 in which said intermediate races are driven at different speeds with respect to each other.

9. In a combination as recited in claim 6 in which each of said intermediate races is driven through a greater angle in one direction than the other by driving at equal speeds in each direction and for different times in each direction.

10. In a combination as recited in claim 6 in which each of said intermediate races is driven through a greater angle in one direction than the other by driving at unequal speeds in each direction and for equal times in each direction.

11. In a combination as recited in claim 6 in which each of said intermediate races is driven through a greater angle in one direction than the other by driving at unequal speeds in each direction and for unequal times in each direction.

12. In gyroscopic apparatus:
(a) a sensitive element,
(b) first and second spaced bearing means supporting said sensitive element for rotational movement about an axis thereof,
(c) each of said bearing means including an inner and outer race and an intermediate rotatable race with ball bearing members disposed between said races and defining a ball complement,
(d) drive means coupled in driving relation to said intermediate races for rotating said races through discrete angles in response to discrete electrical pulses,
(e) first means coupled to said drive means for supplying a first plurality of pulses in a sense to cause rotation of said drive means in a first direction,
(f) second means coupled to said drive means for supplying a second plurality of pulses in a sense to cause rotation of said drive means in a second direction opposite with respect to said first direction,
(g) and counting means responsive to said first and second pulses for sequentially rendering said drive means responsive to said first pulses for driving said intermediate races through a first angle and to said second pulses for driving said intermediate races through a second angle different from said first angle.

13. In gyroscopic apparatus of the character recited in claim 12 and further including means for reversing the direction of rotation with respect to said first and second angles only after at least one full revolution of progression of said ball complement.

14. In an apparatus having a plurality of sensitive elements:
(a) suspension means including rotatable bearing means mounted on at least one axis of at least one of said sensitive elements,
(b) said rotatable bearing means having at least an inner and outer race and one rotatable intermediate race supporting rolling members therebetween,
(c) power transmission means operably coupled to said intermediate race,
(d) and means operably coupled to said power transmission means for sequentially rotating said intermediate race through a first angle in a first direction and through a second angle different from said first angle in a second direction opposite to said first direction to assure progression of said rolling members associated with said intermediate race.

15. In an apparatus having a plurality of sensitive elements:
(a) first and second bearing means for rotatably supporting each of said sensitive elements about respective axes thereof,
(b) each of said bearing means including an inner and outer race and a rotatable intermediate race supporting rolling members therebetween,
(c) said rolling members defining a ball complement,
(d) power transmission means operably coupled to each of said rotatable intermediate races,
(e) drive means operably coupled to said power transmission means for rotating each one of said pair of rotatable intermediate races in a direction opposite to the other one of said pair,
(f) and means for periodically and simultaneously driving said intermediate races of a pair through first angles and simultaneously reversing the direction of rotation of said drive means for driving said intermediate races of each pair through second angles different from said first angles and periodically and simultaneously reversing the direction of rotation of said intermediate races.

16. In a combination as recited in claim 15 and further including additional control means for reversing the direction of rotation with respect to said first and second angles only after at least one full revolution of progression of said rolling members associated with said respective intermediate races.

17. In a combination as recited in claim 15 in which said intermediate races are driven at different speeds with respect to each other.

18. In a combination as recited in claim 15 in which each of said intermediate races is driven through a greater angle in one direction than the other by driving at equal speeds in each direction and for different times in each direction.

19. In a combination as recited in claim 15 in which each of said intermediate races is driven through a greater angle in one direction than the other by driving at unequal speeds in each direction and for equal times in each direction.

20. In a combination as recited in claim 15 in which each of said intermediate races is driven through a greater angle in one direction than the other by driving at unequal speeds in each direction and for unequal times in each direction.

21. In a stable reference apparatus having three gyroscopes:
 (a) first and second bearing means for rotatably supporting each of said gyroscopes about respective precision axes thereof,
 (b) each of said bearing means including an inner and outer race and rotatable intermediate race supporting rolling members therebetween,
 (c) said rolling members defining a ball complement,
 (d) power transmission means operably coupled to each of said rotatable intermediate races,
 (e) drive means operably coupled to said power transmission means for rotating each one of said pair of rotatable intermediate races in a direction opposite to the other one of said pair,
 (f) and means for periodically and simultaneously driving said intermediate races of a pair through first angles and simultaneously reversing the direction of rotation of said drive means for driving said intermediate races of each pair through second angles different from said first angles and periodically and simultaneously reversing the direction of rotation of said intermediate races.

References Cited
UNITED STATES PATENTS

| | | | |
|---|---|---|---|
| 3,025,114 | 3/1962 | Beecher | 308—183 |
| 3,200,652 | 8/1965 | Chaggaris | 74—5 |
| 3,237,457 | 3/1966 | Luber | 74—5 |

FRED C. MATTERN, JR., *Primary Examiner.*

J. D. PUFFER, *Assistant Examiner.*